United States Patent
Abusleme et al.

(10) Patent No.: US 10,173,177 B2
(45) Date of Patent: Jan. 8, 2019

(54) PROCESS FOR THE PREPARATION OF ETHYLENE/ CHLOROTRIFLUOROETHYLENE POLYMER MEMBRANES

(75) Inventors: Julio A Abusleme, Saronno (IT); Ivan Pagin, Bergamo (IT); Anna Maria Bertasa, Gazzaniga (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 642 days.

(21) Appl. No.: 13/388,582

(22) PCT Filed: Jul. 29, 2010

(86) PCT No.: PCT/EP2010/061063
§ 371 (c)(1),
(2), (4) Date: Feb. 2, 2012

(87) PCT Pub. No.: WO2011/015517
PCT Pub. Date: Feb. 10, 2011

(65) Prior Publication Data
US 2012/0125835 A1    May 24, 2012

(30) Foreign Application Priority Data
Aug. 3, 2009  (EP) .................................... 09167086

(51) Int. Cl.
*B01D 71/32*    (2006.01)
*B01D 67/00*    (2006.01)
*B01D 69/08*    (2006.01)

(52) U.S. Cl.
CPC .......... *B01D 71/32* (2013.01); *B01D 67/0011* (2013.01); *B01D 69/08* (2013.01); *B01D 2325/32* (2013.01)

(58) Field of Classification Search
CPC .............. B01D 67/009; B01D 67/0013; B01D 67/0016; B01D 67/0018; B01D 71/32; B01D 2323/08; B01D 2323/22; B01D 67/0011; B01D 69/08; B01D 2325/32
USPC ............... 210/500.1, 500.21, 500.27, 500.36
See application file for complete search history.

(56) References Cited

U.S. PATENT DOCUMENTS

| | | | |
|---|---|---|---|
| 4,623,670 | A | 11/1986 | Mutoh et al. |
| 4,702,836 | A | 10/1987 | Mutoh et al. |
| 5,043,113 | A | 8/1991 | Kafchinski et al. |
| 5,396,019 | A | 3/1995 | Sartori et al. |
| 6,096,213 | A | 8/2000 | Radovanovic et al. |
| 6,896,777 | B2 | 5/2005 | Arcella et al. |
| 6,902,676 | B2 | 6/2005 | Arcella et al. |
| 2003/0192826 | A1* | 10/2003 | Wang ................ B01D 19/0031 210/500.21 |
| 2004/0023017 | A1* | 2/2004 | Nagoya et al. ............ 428/310.5 |
| 2006/0157404 | A1* | 7/2006 | Mullette et al. ......... 210/500.21 |
| 2007/0007197 | A1* | 1/2007 | Mahendran et al. .... 210/500.36 |
| 2011/0244013 | A1* | 10/2011 | Mrozinski ............ B01D 67/002 424/409 |

FOREIGN PATENT DOCUMENTS

| | | |
|---|---|---|
| EP | 1236503 A1 | 9/2002 |
| EP | 1743921 A1 | 1/2007 |
| WO | WO 03068374 A1 | 8/2003 |
| WO | WO 05002712 A1 | 1/2005 |
| WO | WO 05037917 A1 | 4/2005 |

OTHER PUBLICATIONS

Strathmann H.—"Membranes and Membrane Separation Processes", Ullmann's Encyclopedia of Industrial Chemistry, 7th edition, 2005, published by John Wiley & Sons, Inc. (DOI: 10.1002/14356007.a16_187.pub2; 78 pgs.

Solvay Solexis—"Halar ECTFE", www.solvaysolexis.com, 2006—Retrieved from the Internet on Feb. 3, 2010; URL:http://www.solvaysolexis.com/static/wma/pdf/9/2/2/0/TR_Halar.pdf—XP002566590; 6 pgs.

Simone, S., et al., "Preparation and characterization of EXTFE solvent resistant membranes and their application in pervaporation of toluene/water mixtures"; Separation and Purification Technology, vol. 90, (2012; Elsevier B.V. doi: 10.1016/j.seppur.2012.02.022; pp. 147-161.

"Processing Guide for Polymer Membranes"; 2014 Solvay Specialty Polymers Technical Bulletin, Version 4.3; D 10/2012/R May 2014 (11 pages).

Roh, Il Juhn, et al., "Poly(ethylene chlorotrifluoroethylene) membrane formation via thermally induced phase separation (TIPS)"; Journal of Membrane Science, vol. 362 (2010); Elsevier B.V. 2010, doi: 10.1016/memsci.2010.06.042; pp. 211-220.

Ramaswamy, Senthilkumar, et al., "Fabrication of poly (ECTFE) membranes via thermally induced phase separation"; Journal of Membrane Science, vol. 210 (2002); Elsevier Science B.V. 2002, PII: S0376-7388(02)00383-6; pp. 175-180.

* cited by examiner

*Primary Examiner* — David C Mellon
*Assistant Examiner* — Liam Royce
(74) *Attorney, Agent, or Firm* — Osha Liang LLP

(57) ABSTRACT

The invention relates to a process for the production of membranes based on ethylene/chlorotrifluoroethylene polymers having a melting temperature not exceeding 200° C. The process relies on the diffusion induced phase separation of the ethylene/chlorotrifluoroethylene polymer from a solution and comprises the steps of providing a solution comprising an ethylene/chlorotrifluoroethylene polymer having a melting temperature not exceeding 200° C. in a solvent; casting the polymer solution into a film; immersing the film in a non-solvent bath to precipitate the polymer. Membranes made of compositions comprising an ethylene/chlorotrifluoroethylene polymer having a melting temperature not exceeding 200° C. and at least one second polymer are also disclosed.

13 Claims, No Drawings

PROCESS FOR THE PREPARATION OF ETHYLENE/ CHLOROTRIFLUOROETHYLENE POLYMER MEMBRANES

CROSS-REFERENCE TO RELATED APPLICATIONS

This application is a U.S. national stage entry under 35 U.S.C. § 371 of International Application No. PCT/EP2010/ 061063 filed Jul. 29, 2010, which claims priority to European Application No. EP 09167086.9 filed on Aug. 3, 2009, the whole content of these applications being herein incorporated by reference for all purposes.

TECHNICAL FIELD

The present invention relates to a process for the preparation of fluoropolymer membranes. In particular the invention relates to a diffusion induced precipitation process for the preparation of membranes comprising ethylene/chlorotrifluoroethylene polymers having a melting temperature not exceeding 200° C.

BACKGROUND ART

Copolymers of ethylene and chlorotrifluoroethylene are known for their chemical and mechanical resistance, in particular for their elevated resistance towards oxidising agents and highly basic solutions. These properties make the use of ethylene/chlorotrifluoroethylene polymers highly advantageous in membrane applications, in particular in the field of wastewater treatment where the cleaning of the membrane requires the use of highly oxidising and aggressive agents.

Membranes based on ethylene/chlorotrifluoroethylene polymers are known from the prior art. U.S. Pat. No. 4,623,670 (ASAHI CHEMICAL IND [JP]) Nov. 18, 1986 and U.S. Pat. No. 4,702,836 (ASAHI CHEMICAL IND [JP]) Oct. 27, 1987 disclose a process for preparing membranes made of a fluoropolymer, including copolymers of ethylene with chlorotrifluroethylene, said process comprising mixing 10-60% by volume of the polymer, 7-42% by volume of an inert compound, such as silica, and 30-75% by volume of chlorotrifluoroethylene oligomers as plasticizer; extruding the plasticized compound into pellets; subsequently melt-molding said pellets into articles, such as hollow fibers; removing by a first extraction the plasticizer from the molded article; and then removing by a second extraction, with a strong acid or base, the inert compound. This process has a number of drawbacks: it requires the working of the polymer at temperatures of 230-250° C. both during the plasticization and the molding step; the use of high amounts of the chlorotrifluroethylene oligomer plasticizer which has to be removed with chlorinated solvents, like 1,1,1-trichloroethane; the addition of an inert compound, to give sufficient mechanical properties to the polymer during the molding step, and which also has to be removed by extraction. The process is thus complicated and expensive.

EP 1236503 A (AUSIMONT SPA [IT]) Sep. 4, 2002 discloses a process for the preparation of porous membranes wherein ethylene/chlorotrifluoroethylene polymers, namely terpolymers comprising from 10 to 70% by moles of ethylene, from 30 to 90% by moles of chlorotrifluoroethylene, from 0.1 to 30% by moles, with respect to the total amount of ethylene and chlorotrifluoroethylene, of a hydrogenated monomer of formula: $CH_2=CH-(CH_2)_nR1$ wherein $R1=-OR2$, or $-(O)_tCO(O)_pR2$ wherein t and p are integers equal to 0 or 1 and R2 is a linear or branched $C_1$-$C_{20}$ alkyl, or a cycloalkyl, optionally containing heteroatoms and/or chlorine atoms, are melt blended with a hydrogenated plasticizer, selected from the group of citrates, phthalates, trimellitates and the like, molded into an article by injection or compression molding at temperatures of about 200° C. and subsequently dipped into a solvent, such as a $C_1$-$C_6$ aliphatic alcohol, to extract the plasticizer.

WO 2005/037917 A (ZENON ENVIRONMENTAL INC) Apr. 28, 2005 discloses a temperature induced phase inversion process for membrane manufacture in which a polymer, inter alia an ethylene/chlorotrifluoroethylene polymer, is melt blended with a high boiling compound acting as a plasticizer, such as tri-isononyl trimellitate; shaped into an article either by molding or melt-spinning, optionally in the presence of a support; cooled to induce membrane formation and then subjected to an extraction treatment to remove the high boiling plasticizer.

WO 03/068374 A (US FILTER WASTEWATER GROUP INC) Aug. 21, 2003 discloses a temperature induced phase separation process for the production of ethylene/chlorotrifluoroethylene membranes wherein a blend of the polymer and a solvent, such as glycerine triacetate or citric acid acetyl ester, is prepared at a temperature in excess of 200° C.; the blend is formed into the appropriate shape and cooled until the polymer solidifies, then the solvent is extracted from the solidified membrane.

WO 2005/002712 (FILTER WASTEWATER GROUP INC) Jan. 13, 2005 discloses polymeric ultrafiltration or microfiltration membranes made from a variety of polymers, including ethylene-chlorotrifluoroethylene polymers and possibly modified by addition of polyvinylmethylether. Among others, manufacture of membranes made from HALAR® 901 by 'TIPS' technique, i.e. temperature induced phase separation process, is disclosed.

EP 1743921 A (SOLVAY SOLEXIS S.P.A.) Jan. 17, 2007 discloses thermoplastic compositions made of a halopolymer such as notably an ethylene/chlorotrifluoroethylene copolymer in admixture with other ingredients (a perfluoropolymer and a perfluoropolyether), which can be useful for the manufacture of several shaped articles, including, notably, membranes.

Thus, a need still exists in the art for a process for the production of ethylene/chlorotrifluoroethylene polymer membranes that does not require the working of the polymer at high temperatures. Also the need still exists for a process that does not require the use of high quantities of plasticizers and of lengthy extraction processes for their removal.

It has now been found that by using ethylene/chlorotrifluoroethylene polymers having a melting temperature not exceeding 200° C. it is possible to obtain membranes via a diffusion induced precipitation process.

The diffusion induced precipitation process, also defined as "diffusion induced phase-separation process", is a well known process for the preparation of polymeric membranes whereby a polymer material is dissolved in an appropriate solvent to form a solution, the solution is cast in a membrane-forming layer which is then immersed in a non-solvent. The contact of the membrane-forming layer with the non-solvent induces the formation of two phases: a polymer-rich solid phase that forms the membrane structure and a solvent-rich liquid phase that forms the liquid filled membrane pores.

Advantageously the diffusion induced precipitation process does not require working of the polymer at temperatures higher than 200° C., i.e. at temperatures close to the ones at which the polymer may start to degrade. The process does not require the use of plasticizers, which have to be extracted with a suitable solvent and then recovered at the end of the membrane production process. Solvents of common use can be employed to prepare the polymer solution and water can be used as the non-solvent to induce both the precipitation of the polymer from the solution and, at the same time, the removal of the solvent.

Porous membranes of vinylidene fluoride polymers are typically produced using a diffusion induced precipitation process. The possibility of processing ethylene/chlorotrifluoroethylene polymers with the same technology as vinylidene fluoride polymers is a further advantage provided by the present invention.

DISCLOSURE OF INVENTION

Object of the present invention is therefore a process for preparing an ethylene/chlorotrifluoroethylene polymer membrane comprising the steps of:
  preparing a solution comprising an ethylene/chlorotrifluoroethylene polymer having a melting temperature not exceeding 200° C. in a solvent;
  casting the polymer solution into a film;
  immersing the film in a non-solvent bath to precipitate the polymer.

This and other objects, advantages, and features of the invention will be more readily understood and appreciated by reference to the detailed description of the invention.

The term "membrane" is used herein in its usual meaning, that is to say it refers to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane).

Porous membranes are generally characterized by the average pore diameter and the porosity, i.e. the fraction of the total membrane that is porous.

Membranes having a uniform structure throughout their thickness are generally known as symmetrical membranes, which can be either dense or porous; membranes having pores which are not homogeneously distributed throughout their thickness are generally known as asymmetric membranes. Asymmetric membranes are characterized by a thin selective layer (0.1-1 μm thick) and a highly porous thick layer (100-200 μm thick) which acts as a support and has little effect on the separation characteristics of the membrane.

Membranes can be in the form of a flat sheet or in the form of tubes. Tubular membranes are classified based on their dimensions in tubular membranes having a diameter greater than 3 mm; capillary membranes, having a diameter comprised between 0.5 mm and 3 mm; and hollow fibers having a diameter of less than 0.5 mm. Oftentimes capillary membranes are also referred to as hollow fibres.

Flat sheet membranes are generally preferred when high fluxes are required whereas hollow fibres are particularly advantageous in applications where compact modules with high surface areas are required.

Depending on their applications membranes may also be supported to improve their mechanical resistance. The support material is selected to have a minimal influence on the selectivity of the membrane.

As used herein the terms "ethylene/chlorotrifluoroethylene polymer" and "ECTFE" are used interchangeably to refer to fluoropolymers comprising ethylene and chlorotrifluoroethylene as the major monomer components and optionally one or more hydrogenated or fluorinated comonomer(s). ECTFE polymers typically comprise:
  (a) from 10 to 90%, preferably from 30 to 70 by moles of ethylene (E);
  (b) from 90 to 10%, preferably from 70 to 30%, by moles of chlorotrifluoroethylene (CTFE); and
  (c) from 0 to 30%, preferably from 0 to 15% by moles, based on the total amount of monomers (a) and (b), of one or more fluorinated and/or hydrogenated comonomer(s).

Non limiting examples of fluorinated comonomers are for instance perfluoroalkylvinylethers, perfluoroalkylethylenes (such as perfluorobutylethylene), perfluorodioxoles, vinylidenefluoride. Among them, the preferred comonomer is perfluoropropylvinylether of formula $CF_2=CFO-C_3F_7$.

Non limiting examples of hydrogenated comonomers, are those having the general formula: $CH_2=CH-(CH_2)_nR_1$ wherein $R_1=OR_2$, or $-(O)_tCO(O)_pR_2$ wherein t and p are integers equal to 0 or 1 and $R_2$ is H or a hydrogenated linear or branched alkyl or cycloalkyl radical having from 1 to 20 carbon atoms, optionally containing heteroatoms and/or chlorine atoms, the heteroatoms preferably being O or N; $R_2$ optionally contains one or more functional groups, preferably selected from OH, COOH, epoxide, ester and ether, $R_2$ may optionally contain double bonds; n is an integer in the range 0-10. Preferably $R_2$ is an alkyl radical having from 1 to 10 carbon atoms containing hydroxyl functional groups and n is an integer in the range 0-5.

Preferred hydrogenated comonomers are selected from the following classes:
  acrylic monomers having the general formula: $CH_2=CH-CO-O-R_2$, wherein $R_2$ is selected from ethylacrylate, n-butylacrylate, acrylic acid, hydroxyalkylacrylates, such as hydroxyethylacrylate, hydroxypropylacrylate, (hydroxy)ethylhexylacrylate;
  vinylether monomers having the general formula: $CH_2=CH-O-R_2$, wherein $R_2$ is selected from propylvinylether, cyclohexylvinylether, vinyl-4-hydroxybutylether;
  vinyl monomers of the carboxylic acid having the general formula: $CH_2=CH-O-CO-R_2$, wherein $R_2$ is selected from vinyl acetate, vinyl propionate, vinyl-2-ethylhexanoate;
  unsaturated carboxylic acid monomers having the general formula: $CH_2=CH-(CH_2)_n-COOH$, wherein n has the above mentioned meaning, for instance vinylacetic acid.

Any of the ECTFE polymers described above can be used in the membrane preparation process of the invention provided they have a melting temperature not exceeding 200° C., even not exceeding 198° C., preferably not exceeding 195° C., more preferably not exceeding 193° C., even more preferably not exceeding 190° C. The ECTFE polymer has a melting temperature of advantageously at least 120° C., preferably of at least 130° C., still preferably of at least 140° C., more preferably of at least 145° C., even more preferably of at least 150° C.

In the remainder of the text, unless otherwise indicated the phrase "ECTFE polymer" will refer to an ECTFE polymer having a melting temperature not exceeding 200° C.

The melting temperature is determined by Differential Scanning Calorimetry (DSC) at a heating rate of 10° C./min, according to ASTM D 3418.

Although polymers having melting temperatures below 120° C. can be employed for the preparation of membranes through the process of the invention the resulting membranes tend to have unsatisfactory mechanical properties.

ECTFE polymers having a melting temperature of less than 200° C. typically comprise:
(a) from 30 to 50%, preferably from 35 to 47% by moles of ethylene (E);
(b) from 50 to 70%, preferably from 53 to 65% by moles of chlorotrifluoroethylene (CTFE); and
(c) from 0 to 15%, preferably from 0 to 10% by moles, based on the total amount of monomers (a) and (b), of one or more fluorinated and/or hydrogenated comonomer(s) as defined above.

Preferably the comonomer is a hydrogenated comonomer selected from the group of the acrylic monomers as above defined. More preferably the hydrogenated comonomer is selected from the group of the hydroxyalkylacrylate comonomers, such as hydroxyethylacrylate, hydroxypropylacrylate and (hydroxy)ethylhexylacrylate.

The melt flow rate of the ECTFE polymer, measured following the procedure of ASTM 3275-81 at 220° C. and 2.16 Kg, ranges generally from 0.01 to 30 g/10 min, preferably from 0.1 to 10 g/10 min, more preferably from 0.3 to 5 g/10 min.

When ECTFE polymers having a melting temperature not exceeding 200° C. are used it is possible to obtain solutions of the polymer in a solvent having sufficiently high polymer concentrations and suitable viscosities to allow the production of a membrane at temperatures which are still viable from an industrial point of view in relation to diffusion induced precipitation processes.

Provided a homogeneous and transparent solution can be obtained at the temperature of the solution during the casting step, more than one polymer may be used to prepare the polymer solution and, consequently, the final membrane.

More than one ECTFE polymer having a melting temperature not exceeding 200° C. may be used to prepare the polymer solution. The different ECTFE polymers can be blended in any proportion, provided they form homogeneous solutions. In general no more than five, preferably no more than three, more preferably no more than two and even more preferably only one ECTFE polymer with a temperature not exceeding 200° C. will be used in the membrane preparation process of the invention.

An ECTFE polymer with a melting temperature higher than 200° C. may also be blended with the ECTFE polymer. In such a case, the ECTFE polymer with a melting temperature not exceeding 200° C. represents more than 50% by weight, preferably more than 60% by weight, more preferably more than 70% by weight and even more preferably more than 80% by weight of the total amount of polymer present in solution. The ECTFE polymer with a melting temperature not exceeding 200° C. can be up to 99% by weight of the total amount of polymer present in solution. The ECTFE polymer with a melting temperature higher than 200° C. is typically less than 50% by weight, preferably less than 40% by weight, more preferably less than 30% by weight and even more preferably less than 20% by weight of the total amount of polymer in the polymer solution. The ECTFE polymer with a melting temperature higher than 200° C. can be as little as 1% by weight of the total amount of polymer present in solution.

The higher melting ECTFE polymer may have a melting temperature of 205° C., 210° C., 220° C. and up to 240° C.

A polymer which is not an ethylene/chlorotrifluoroethylene polymer may alternatively or in addition be added to the ECTFE polymer in solution, typically in an amount of less than 50% by weight, preferably of less than 25% by weight, more preferably of less than 10% by weight and even more preferably of less than 5% by weight with respect to the total amount of polymer present in solution. The chemical nature of this polymer is generally selected to form miscible compositions with the ECTFE polymer at the temperature of the polymer solution during the casting step.

The term "solvent" is used herein in its usual meaning, that is it indicates a substance capable of dissolving another substance (solute) to form an uniformly dispersed mixture at the molecular level. In the case of a polymeric solute it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates.

Polar aprotic organic solvents can be used as solvents for ECTFE polymers having a melting temperature not exceeding 200° C. Suitable solvents for the process of the present invention are those selected from the group consisting of N-methyl-2-pyrrolidone, dimethylformamide, acetone, dimethylacetamide, tetrahydrofuran, methyl ethyl ketone, dimethylsulfoxide, dioxane, ethyl acetate, propylene carbonate, and mixtures thereof. Among these preferred solvents are N-methyl-2-pyrrolidone, dimethylformamide, acetone, dimethylacetamide, tetrahydrofuran, methyl ethyl ketone and dimethylsulfoxide, in particular N-methyl-2-pyrrolidone.

In general the solubility of the ECTFE polymer in the selected solvent at the temperature of the solution during the casting step should be greater than 10% by weight, preferably greater than 12% by weight, more preferably greater than 15% by weight, with respect to the total weight of the solution.

The term "solubility" is defined herein as the maximum amount of polymer, measured in terms of weight of the polymer per weight of solution, which dissolves at a given temperature affording a transparent homogeneous solution without the presence of any phase separation in the system.

The polymer solution can be prepared in any conventional manner. For instance, the solvent can be added to the polymer, or, preferably, the polymer can be added to the solvent, or even the polymer and the solvent can be simultaneously combined.

The solution of the ECTFE polymer in the solvent is prepared at a temperature of advantageously at least 50° C., preferably at least 80° C., more preferably at least 90° C. and even more preferably at least 100° C. The solution of the ECTFE polymer in the solvent is prepared at a temperature of advantageously less than 180° C., preferably less than 170° C., more preferably less than 160° C., and even more preferably less than 150° C. Higher temperatures can of course be used for the solution preparation step, however they are not preferred from a practical and/or economical point of view.

The overall concentration of the polymer in the solution should be at least 10% by weight, preferably at least 12% by weight. Typically the concentration of the polymer in the solution does not exceed 50% by weight, preferably it does not exceed 40% by weight, more preferably it does not exceed 30% by weight.

The polymer solution may contain additional components, such as pore forming agents, nucleating agents, fillers and the like. A suitable pore forming agent is for instance polyethyleneglycol (PEG), in particular low molecular weight PEG such as PEG 400. When added to the ECTFE polymer solution in amounts typically ranging from 0.1 to 5% by weight, preferably from 0.5 to 3% by weight, transparent homogeneous solutions are obtained. Pore forming agents are generally removed from the membrane in the non-solvent bath.

The mixing time required to obtain the polymer solution can vary widely depending upon the rate of solution of the components, the temperature, the efficiency of the mixing apparatus, the viscosity of the polymer solution being prepared, and the like. Any suitable mixing equipment may be used. Preferably, the mixing equipment is selected to reduce the amount of air entrapped in the polymer solution which may cause defects in the final membrane. The mixing of the polymer and the solvent may be conveniently carried out in a sealed container, optionally held under an inert atmosphere.

Once a homogenous and transparent solution comprising the ECTFE polymer in the solvent is prepared, the solution is cast into a film.

The term "film" is used herein to refer to the layer of polymer solution obtained after the casting of the polymer solution. Depending on the final form of the membrane the film may be either flat, when flat membranes are required, or tubular in shape, when tubular or hollow fiber membranes are to be obtained.

The temperature of the solution during the casting step may be or may be not the same as the temperature during the solution preparation step. The temperature of the solution during the casting step typically does not exceed 180° C., preferably it does not exceed 170° C., more preferably it does not exceed 160° C., even more preferably it does not exceed 150° C. During the casting step the polymer solution is at a temperature of generally at least 90° C., preferably at least 100° C.

The viscosity of the polymer solution at the temperature of the casting step is typically at least 1 Pa.s. The viscosity of the polymer solution typically does not exceed 100 Pa.s.

Different casting techniques are used depending on the form of the membrane. When the final product is a flat membrane the polymer solution is cast as a film over a flat support, typically a plate, a belt or a fabric, by means of a casting knife or a draw-down bar.

Accordingly in its first embodiment the process of the invention comprises the steps of:
preparing a solution comprising an ECTFE polymer having a melting temperature not exceeding 200° C. in a solvent;
casting the polymer solution into a flat film on a support;
immersing the film in a non-solvent bath to precipitate the polymer from the solution.

Hollow fiber and capillary membranes can be obtained by the so-called wet-spinning process. In such a process the polymer solution is generally pumped through a spinneret, that is an annular nozzle comprising at least two concentric capillaries: a first outer capillary for the passage of the polymer solution and a second inner one for the passage of a supporting fluid, generally referred to as "lumen". The lumen acts as the support for the casting of the polymer solution and maintains the bore of the hollow fiber or capillary precursor open. The lumen may be a gas, or, preferably, a liquid at the conditions of the spinning of the fiber. The selection of the lumen and its temperature depends on the required characteristics of the final membrane as they may have a significant effect on the size and distribution of the pores in the membrane. In general the lumen is not a strong non-solvent for the polymer or, alternatively, it contains a solvent or weak solvent for the polymer. The lumen is typically miscible with the non-solvent and with the solvent for the polymer. The temperature of the lumen generally approximates the temperature of the polymer solution.

At the exit of the spinneret, after a short residence time in air or in a controlled atmosphere, the hollow fiber or capillary precursor is immersed in the non-solvent bath wherein the polymer precipitates forming the hollow fiber or capillary membrane.

Accordingly in its second embodiment the process of the invention comprises the steps of:
preparing a solution comprising an ECTFE polymer having a melting temperature not exceeding 200° C. in a solvent;
casting the polymer solution into a tubular film around a supporting fluid;
immersing the tubular film into a non-solvent bath to precipitate the polymer.

The casting of the polymer solution is typically done through a spinneret. The supporting fluid forms the bore of the final hollow fiber or capillary membrane. When the supporting fluid is a liquid, immersion of the fiber precursor in the non-solvent bath also advantageously removes the supporting fluid from the interior of the fiber.

Tubular membranes, because of their larger diameter, are produced using a different process from the one employed for the production of hollow fiber membranes.

In its third embodiment the process of the invention comprises the steps of:
preparing a solution comprising an ECTFE polymer having a melting temperature not exceeding 200° C. in a solvent;
casting the polymer solution into a tubular film over a supporting tubular material;
immersing the tubular film into a non-solvent bath to precipitate the polymer from the solution.

After the casting of the polymer solution has been completed the cast film is immersed into a non-solvent bath to induce the precipitation of the polymer from the solution. The precipitated polymer forms the final membrane structure.

As used herein the term "non-solvent" is taken to indicate a substance incapable of dissolving a given component of a solution or mixture.

Suitable non-solvents for the ECTFE polymer are water and aliphatic alcohols, preferably, aliphatic alcohols having a short chain, for example from 1 to 6 carbon atoms, more preferably methanol, ethanol and isopropanol. Blends of water and small amounts of a solvent for the ECTFE polymer can be used in the precipitation bath. Use of solvent/non-solvent mixtures advantageously allows to control the porosity of the membrane. In general the solvent used for the preparation of the ECTFE polymer solution is soluble in the non-solvent. Preferably the non-solvent in the process of the invention is water. Water is the most inexpensive non-solvent and it can be used in large amounts.

The non-solvent in the precipitation bath is usually held at a temperature of at least 0° C., preferably of at least 15° C., more preferably of at least 20° C. The non-solvent in the precipitation bath is usually held at a temperature of less than 90° C., preferably of less than 70° C., more preferably of less than 60° C. The temperature gradient between the cast film and the non-solvent bath may influence the pore size and/or pore distribution in the final membrane as it affects the rate of precipitation of the polymer from the solution. If precipitation is rapid, a skin will generally form on the surface of the cast film in contact with the non-solvent which will typically slow down the diffusion of the non-solvent in the bulk of the polymer solution leading to a membrane with an asymmetric structure. If precipitation is slow, the pore-forming liquid droplets of the solvent-rich liquid phase, which forms upon contact with the non-solvent, usually tend to agglomerate while the polymer solution is still fluid. As a consequence the membrane will have a more homogeneous, symmetrical structure. The appropriate temperature of the non-solvent bath can be determined for each specific case with routine experiments.

Once removed from the precipitation bath the membrane may undergo additional treatments, for instance rinsing. As a last step the membrane is typically dried.

The membrane obtained from the process of the invention is preferably a porous membrane. Typically the membrane has an asymmetric structure. The porosity of the membrane may range from 3 to 90%, preferably from 5 to 80%.

The pores may have an average diameter of at least 0.001 µm, of at least 0.005 µm, of at least 0.01 µm, of at least 0.1 µm, of at least 1 µm, of at least 10 µm and of at most 50 µm. Suitable techniques for the determination of the average pore size in porous membranes are described for instance in "Membranes and Membrane Separation Processes", by H. Strathmann in "Ullmann's Encyclopedia of Industrial Chemistry", 7th edition, published by John Wiley & Sons, Inc. (DOI: 10.1002/14356007.a16_187.pub2).

According to a second object of the present invention there is provided a membrane made of a composition comprising an ECTFE polymer having a melting temperature not exceeding 200° C. and at least one second polymer.

The membrane of the invention can be manufactured via the process as above detailed.

In a first embodiment the membrane is made of a composition of two or more ECTFE polymers having a melting temperature not exceeding 200° C. The different ECTFE polymers can be blended in any proportion.

In a second embodiment the membrane is made of a composition comprising an ECTFE polymer having a melting temperature not exceeding 200° C. and an ECTFE polymer having a melting temperature higher than 200° C. The membrane is generally made of a composition comprising more than 50% by weight of an ECTFE polymer having a melting temperature not exceeding 200° C. and less than 50% by weight of an ECTFE polymer having a melting temperature higher than 200° C. The ECTFE polymer with a melting temperature not exceeding 200° C. is preferably more than 60% by weight, more preferably more than 70% by weight and even more preferably more than 80% by weight. The ECTFE polymer with a melting temperature not exceeding 200° C. can be up to 99% by weight. The ECTFE polymer with a melting temperature higher than 200° C. is preferably less than 40% by weight, more preferably less than 30% by weight and even more preferably less than 20% by weight of the total amount of polymer present in the membrane. The ECTFE polymer with a melting temperature higher than 200° C. can be as little as 1% by weight.

The presence of an ECTFE polymer with a melting temperature higher than 200° C. may improve the mechanical characteristics of the membrane. In general it is observed that the higher the melting temperature of the ECTFE polymer, the higher its crystallinity and the better its mechanical properties, in particular the modulus and the yield stress at high temperatures.

Should the disclosure of any of the patents, patent applications, and publications that are incorporated herein by reference conflict with the present description to the extent that it might render a term unclear, the present description shall take precedence.

The invention will be illustrated by means of the following non-limiting examples.

EXAMPLES

Characterization

Melt flow rate was measured following the procedure of ASTM 3275-81 at a temperature of 220° C. and 2.16 Kg.

Melting temperature was determined by DSC at a heating rate of 10° C./min, according to ASTM D 3418.

Polymer composition was determined by material balance and carbon elemental analysis.

Porosity determination: the porosity was calculated from the following relationship:

$$\text{Porosity \%} = \frac{d_i - d_{pm}}{d_i} \times 100$$

wherein $d_i$ is the density of the polymer used for manufacturing the membrane, $d_{pm}$ is the density of the porous membrane itself, and $d_i$ and $d_{pm}$ are determined by weighing specimens of the copolymer and of the membrane in air and in water at 25° C. following the procedure of ASTM D 792 (method A-1).

Example 1

Preparation of ECTFE1

An ECTFE polymer (ECTFE1) having the molar composition 42% E and 58% CTFE was synthesized in an industrial reactor at a temperature of 15° C. and at a pressure of 7.2 absolute bar.

ECTFE1 had the following properties: melting temperature: 185° C.; melt flow rate: 1.4 g/10 min.

Example 2

Preparation of ECTFE2

In an enameled autoclave equipped with baffles and stirrer working at 450 rpm were introduced: 3 l of demineralized water, 52.5 g of chloroform, 35 ml of an aqueous solution of hydroxypropylacrylate (HPA) (40% volume) and 7 kg of chlorotrifluoroethylene. The temperature was brought to 15° C. and ethylene was fed into the autoclave at a pressure of 8.2 absolute bars. A solution of trichloroacetylperoxide (TCAP) in isooctane (0.12 $g_{TCAP}$/ml) maintained at −17° C. was continuously fed to the autoclave during the polymerization. 35 ml of the solution of hydroxypropylacrylate and water were fed at consumption of 20, 40, 60, 80, 100, 120, 140, 160, and 180 g of ethylene.

The pressure was maintained constant during the polymerization by continuously feeding ethylene to the reactor up to a consumption of 200 g; the initiator solution was introduced at a rate of 30 ml/h. After 345 minutes the product was discharged from the autoclave and dried at 120° C. for about 16 hours. The amount of dry polymer obtained was 1563 g.

ECTFE2 had the following properties: molar composition: E/CTFE/HPA: 40/55/5; melting point: 178° C.; melt flow rate: 0.38 g/10 min.

Determination of the Solubility of ECTFE Polymers in N-methyl-2-pyrrolidone (NMP) at 120° C.

The solubility of ECTFE polymers having different melting temperatures was determined by preparing mixtures of the polymer at different concentrations in NMP. The mixtures were stirred at 140° C. for 60 minutes and then allowed to cool down to 120° C.

The value of the solubility is the maximum amount of polymer which affords a transparent and homogeneous solution, without the presence of any phase separation in the system.

The solubility values for ECTFE1, ECTFE2 and two commercially available ECTFE polymers sold under the trade name Halar® by Solvay Solexis SpA (Bollate, Italy) are reported in Table 1 together with their corresponding melting temperature.

TABLE 1

|  | Tm (° C.) | Solubility in NMP at 120° C. (% w/w) |
| --- | --- | --- |
| ECTFE1 | 185 | 23 |
| ECTFE2 | 178 | 12 |
| Halar ® 902 ECTFE | 220 | <5 |
| Halar ® 901 ECTFE | 240 | <5 |

General Procedure for the Preparation of Membranes

A solution of the ECTFE polymer in NMP, having a concentration between 10 to 20% by weight, was prepared in a glass round bottom flask equipped with two necks. A glass condenser was put on the flask and the apparatus was held at 150° C. for 2 hours at constant magnetic stirring (300 rpm) to obtain a clear homogeneous polymer solution.

A temperate glass plate (30 cm×25 cm) was put on the base of a motorized film applicator (Elcometer 4344/11) equipped with an electrical heating system and heated to maintain the temperature on the glass surface at 120° C. 20 grams of the polymer solution were poured onto the glass plate and cast into a thin film with the help of a casting-knife. Immediately after casting the polymer solution had a temperature of about 120° C. The glass plate was quickly removed from the applicator and dipped in a water bath (having a capacity of 10 l) held at a temperature of approximately 40° C. The glass plate was then extracted from the water bath, the membrane removed from the plate and dried.

Examples 3 and 4

Membranes Made of ECTFE1

Two membranes made of ECTFE1 were prepared following the general procedure described above starting with polymer solutions having a concentration of 16% and 20% by weight of the polymer in NMP. The resulting membranes had the following properties:

ECTFE1 16% by weight solution: membrane thickness 120 μm, porosity 60%;

ECTFE1 20% by weight solution: membrane thickness 200 μm, porosity 64%.

Both membranes were tested in an aqueous solution of NaOH (5% by weight) for 14 days at 70° C. to determine their chemical resistance. After the treatment the membranes were physically undamaged and showed only a slight yellowing.

Example 5

Membrane Made of ECTFE2

A membrane was prepared starting from a 12% by weight solution of ECTFE2 in NMP following the general procedure described above. The resulting membrane had a thickness of 100 μm and 70% porosity.

The membrane was tested in an aqueous solution of NaOH (5% by weight) for 14 days at 70° C. to determine its chemical resistance. After the treatment the membrane was physically undamaged and showed only a slight yellowing.

Example 6

Membrane Made of ECTFE1 and Halar® 902 ECTFE

A membrane was prepared following the general procedure described above starting from a transparent and homogeneous solution prepared by dissolving a blend of 84% by weight ECTFE1 and 16% by weight Halar® 902 in NMP at 120° C. The total concentration of the polymer in solution was 16% by weight (13.5% by weight ECTFE1, 2.5% by weight Halar® 902). The resulting membrane had a thickness of 75 μm and 56% porosity.

Comparative Example 1

Attempt to Prepare a Membrane with Halar® 902 ECTFE

Following the general membrane preparation procedure described above, a solution of Halar® 902 in NMP at 120° C. was prepared. The resulting solution contained less than 5% by weight of the polymer. The polymer solution was cast into a film on a glass plate. When the cast film was immersed in the water bath only a loose precipitate formed. No membrane could be obtained.

The invention claimed is:

1. A process for the preparation of an ethylene/chlorotrifluoroethylene polymer membrane comprising the steps of:
    preparing a polymer solution comprising an ethylene/chlorotrifluoroethylene polymer in a solvent, wherein the polymer in the polymer solution consists essentially of ethylene/chlorotrifluoroethylene polymer that has a melting temperature not exceeding 200° C.;
    casting the ethylene/chlorotrifluoroethylene polymer solution into a film;
    immersing the film in a non-solvent bath to precipitate the polymer via diffusion induced phase separation;
    wherein the solvent is selected from the group consisting of N-methyl-2-pyrrolidone, dimethylformamide, acetone, dimethylacetamide, tetrahydrofuran, methyl ethyl ketone, dimethylsulfoxide, dioxane, ethyl acetate, propylene carbonate, and mixtures thereof.

2. The process of claim 1 wherein during the casting step the polymer solution has a temperature not exceeding 180° C.

3. The process of claim 2 wherein during the casting step the polymer solution has a temperature of at least 100° C. and not exceeding 150° C.

4. The process of claim 1, wherein the non-solvent is water.

5. The process of claim 1, wherein the polymer solution comprises more than one ethylene/chlorotrifluoroethylene polymer having a melting temperature not exceeding 200° C.

6. The process of claim 1 wherein the ethylene/chlorotrifluoroethylene polymer has a melting temperature of at least 150° C. and not exceeding 195° C.

7. The process of claim 1, wherein said ethylene/chlorotrifluoroethylene polymer membrane is a hollow fiber or capillary membrane; wherein said film is a tubular film, and wherein the polymer solution is cast into said tubular film around a supporting fluid through a spinneret.

8. The process of claim 1, wherein said ethylene/chlorotrifluoroethylene polymer membrane is a porous membrane.

9. The process of claim 1, wherein said ethylene/chlorotrifluoroethylene polymer membrane is an asymmetric membrane.

10. The process of claim 1, wherein the polymer solution comprises about 10% to 20% by weight of the ethylene/chlorotrifluoroethylene polymer having a melting temperature not exceeding 200° C.

11. The process of claim 1, wherein the ethylene/chlorotrifluoroethylene polymer has a melting point not exceeding 190 ° C.

12. The process of claim 1, wherein the polymer solution consists essentially of ethylene/chlorotrifluoroethylene polymer in a solvent.

13. The process of claim 1, wherein the polymer solution further comprises at least one additional component selected from the group consisting of pore forming agents, nucleating agents, and fillers.

* * * * *